United States Patent
Hasenour et al.

(10) Patent No.: US 10,617,060 B2
(45) Date of Patent: Apr. 14, 2020

(54) GRAIN SAVING AGRICULTURAL HARVESTING HEAD

(71) Applicant: Deere & Company, Moline, IL (US)

(72) Inventors: Anthony M. Hasenour, Port Byron, IL (US); Daniel S. Hoffman, Bettendorf, IA (US); Anthony J. Washburn, Orion, IL (US)

(73) Assignee: Deere & Company, Moline, IL (US)

( * ) Notice: Subject to any disclaimer, the term of this patent is extended or adjusted under 35 U.S.C. 154(b) by 105 days.

(21) Appl. No.: 15/936,590

(22) Filed: Mar. 27, 2018

(65) Prior Publication Data

US 2018/0352743 A1    Dec. 13, 2018

Related U.S. Application Data

(60) Provisional application No. 62/518,557, filed on Jun. 12, 2017.

(51) Int. Cl.
*A01D 61/02* (2006.01)
*A01D 61/00* (2006.01)
(Continued)

(52) U.S. Cl.
CPC .............. *A01D 61/02* (2013.01); *A01D 34/04* (2013.01); *A01D 41/14* (2013.01); *A01D 57/20* (2013.01);
(Continued)

(58) Field of Classification Search
CPC ........ B65G 15/42; B65G 15/08; A01D 41/14; A01D 57/209; A01D 61/002; A01D 61/02;
(Continued)

(56) References Cited

U.S. PATENT DOCUMENTS

| 137,224 | A | * | 3/1873 | Mansfield | .............. | B65G 15/42 |
| | | | | | | 198/690.2 |
| 810,510 | A | * | 1/1906 | Robins, Jr. | ............. | B65G 15/08 |
| | | | | | | 198/690.2 |

(Continued)

FOREIGN PATENT DOCUMENTS

DE    102015117787 A1    4/2017
EP       2769612 A1      8/2014
(Continued)

OTHER PUBLICATIONS

EP Application No. 18176566.0 Extended European Search Report, dated Nov. 15, 2018, 9 pages.

(Continued)

*Primary Examiner* — Arpad Fabian-Kovacs
(74) *Attorney, Agent, or Firm* — Christopher R. Christenson; Kelly, Holt & Christenson PLLC (57) ABSTRACT

An agricultural harvesting head comprises a frame that supports a cutter configured to cut an agricultural product. The agricultural harvesting head also comprises a set of laterally extending and forward tilted feeding tracks that guide the cut agricultural product to a center of the agricultural harvesting head. The set of feeding tracks comprise a base web of elastomer-impregnated fabric, elongated cleats that extend upward from the base web and extend across substantially the entire width of the base web and a plurality of textured protrusions that extend upward from the web between adjacent elongate cleats. The textured protrusions protrude upward from the base web a distance sufficient to catch and hold grain rolling downhill in a direction perpendicular to the direction of travel of the feeding track and extend over substantially the entire width of the base web. A center feeding track configured to receive the cut agricultural product from the set of laterally extending feeding (Continued)

tracks and guide the agricultural product into a body of an agricultural harvester.

19 Claims, 9 Drawing Sheets

(51) Int. Cl.
*A01D 34/04* (2006.01)
*A01D 41/14* (2006.01)
*A01D 57/20* (2006.01)
*B65G 15/42* (2006.01)

(52) U.S. Cl.
CPC ........... *A01D 61/00* (2013.01); *A01D 61/002* (2013.01); *B65G 15/42* (2013.01)

(58) Field of Classification Search
CPC ........ A01D 34/04; A01D 61/00; A01D 57/20; A01F 15/18; A01F 2015/183
See application file for complete search history.

(56) References Cited

U.S. PATENT DOCUMENTS

| | | | | |
|---|---|---|---|---|
| 874,982 | A | * | 12/1907 | Norton .................. B65G 15/42 198/690.2 |
| 1,817,037 | A | * | 8/1931 | Mattison .............. B65G 17/067 198/690.2 |
| D312,718 | S | * | 12/1990 | McIlwain ...................... D34/29 |
| 5,768,986 | A | * | 6/1998 | Arnold ................... A01F 15/18 100/88 |
| 6,371,280 | B1 | * | 4/2002 | Lindner ................. A01F 15/18 198/690.2 |
| 9,635,810 | B2 | | 5/2017 | Leys et al. |
| 2002/0175055 | A1 | | 11/2002 | Ryde |
| 2004/0148919 | A1 | * | 8/2004 | Dunn ..................... A01D 41/14 56/16.4 R |
| 2011/0094201 | A1 | | 4/2011 | Bomleny et al. |
| 2014/0165526 | A1 | * | 6/2014 | Leys ..................... A01D 41/14 56/181 |
| 2015/0086690 | A1 | * | 3/2015 | Kodali .................. B65G 15/16 426/484 |
| 2017/0094899 | A1 | * | 4/2017 | Webermann ........... A01D 57/20 |
| 2018/0352742 | A1 | * | 12/2018 | Hasenour ............... A01D 41/14 |

FOREIGN PATENT DOCUMENTS

| | | |
|---|---|---|
| JP | D1216108 | 10/2003 |
| JP | D1486685 | 6/2013 |

OTHER PUBLICATIONS

PVC/PU Conveyor Belt with Different Surface Pattern, https://www.okorder.com/p/pvc-pu-conveyor-belt-with-different-surface-pattern_1050348.html, 6 pages. Accessed Mar. 21, 2018.
General Belts, http://www.betolar.co.uk/General_Belts.html, 3 pages. Accessed Mar. 21, 2018.
http://www.stantonbelting.co.uk/belts/the-belts-and-joining-methods/1#ad-image-0, 2 pages. Accessed Mar. 21, 2018.
Conveyor Belting http://capitalbearingsupplies.com.au/conveyor-belting/, 7 pages. Accessed Mar. 21, 2018.
http://www.directindustry.com/prod/tempo-international/product-78801-720937.html, 11 pages. Accessed Mar. 21, 2018.
Conveyor Belt Surfaces http://www.brendma.com.au/portfolio/surfaces/ 15 pages. Accessed Mar. 21, 2018.

* cited by examiner

GRAIN SAVING AGRICULTURAL HARVESTING HEAD

CROSS-REFERENCE TO RELATED APPLICATION

The present application is a continuation of U.S. Provisional Application Ser. No. 62/518,557, filed Jun. 12, 2017, the content of which is hereby incorporated by reference in its entirety.

FIELD OF THE DESCRIPTION

This invention relates to agricultural harvesters. More particularly it relates to agricultural harvesting heads. Even more particularly, it relates to feeding tracks for agricultural harvesting heads.

BACKGROUND

Agricultural harvesters such as combines or windrowers, travel through fields of agricultural crop harvesting the crop. In one common arrangement, agricultural harvesting heads extend forward from the agricultural harvester to engage the plant stalks, sever them, and carry the severed crop into the body of the agricultural harvester itself for further processing. To do this, the agricultural harvesting head has a reciprocating knife supported on the frame of the harvesting head. This reciprocating knife extends laterally, perpendicular to the direction of travel of the agricultural harvester. It extends substantially the entire width of the agricultural harvesting head. The reciprocating knife severs the crop across the width of the agricultural harvesting head and permits it to fall rearward into a laterally extending track. This track conveys cut crop from opposing lateral ends of the agricultural harvesting head to a central region of the head. In the central region, another track changes the direction of crop flow and conveys it rearward into a feeder house of the agricultural harvester.

The discussion above is merely provided for general background information and is not intended to be used as an aid in determining the scope of the claimed subject matter.

SUMMARY

An agricultural harvesting head comprises a frame that supports a cutter configured to cut an agricultural product. The agricultural harvesting head also comprises a set of laterally extending and forward tilted feeding tracks that guide the cut agricultural product to a center of the agricultural harvesting head. The set of feeding tracks comprise a base web of elastomer-impregnated fabric, elongated cleats that extend upward from the base web and extend across substantially the entire width of the base web and a plurality of textured protrusions that extend upward from the web between adjacent elongate cleats. The textured protrusions protrude upward from the base web a distance sufficient to catch and hold grain rolling downhill in a direction perpendicular to the direction of travel of the feeding track and extend over substantially the entire width of the base web. A center feeding track configured to receive the cut agricultural product from the set of laterally extending feeding tracks and guide the agricultural product into a body of an agricultural harvester.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Combine harvester head tracks are typically made in three sections, a left section that conveys the cut crop inwardly from the left side of the harvesting head to the center of the harvesting head, a right section that conveys the crop inwardly from the right side of the harvesting head to the center of the harvesting head, and a center track that receives the crop from the left and right sections and guides it rearward into the feeder house of the agricultural harvester. The left and right sections are typically formed as endless or spliced flexible tracks supported at their inner end and their outer end on elongate rollers mounted to the frame of the agricultural harvesting head. These tracks have a forward edge that is tilted downward toward the ground immediately adjacent to the cutting head in order to catch all of the cut crop material as it falls onto the harvesting head immediately behind the cutting head. These tracks have a rear edge that is elevated above the front edge. As a result, the upper surface of the track is tilted. The tilt of the track permits grain in the cut crop material to roll down the track until it reaches the forward edge of the track adjacent to the reciprocating knife or cutter. If the grain reaches the forward edge of the track, it eventually falls through gaps between the track and the frame of the harvesting head and onto the ground where it is lost.

Past attempts to solve this problem involved placing a retaining rib below the feeding track, just above the cutter. This solution prevents grain from falling transversely over the cutter by catching the grain at a bottom portion of the track. However, grain located at the bottom portion of the left and right-side tracks is more often lost than grain in the middle of the track, while being transferred to the central track. The present description describes a feeding track for an agricultural harvesting head that reduces the ability of the grain to roll down the surface of the track.

Figure 1:
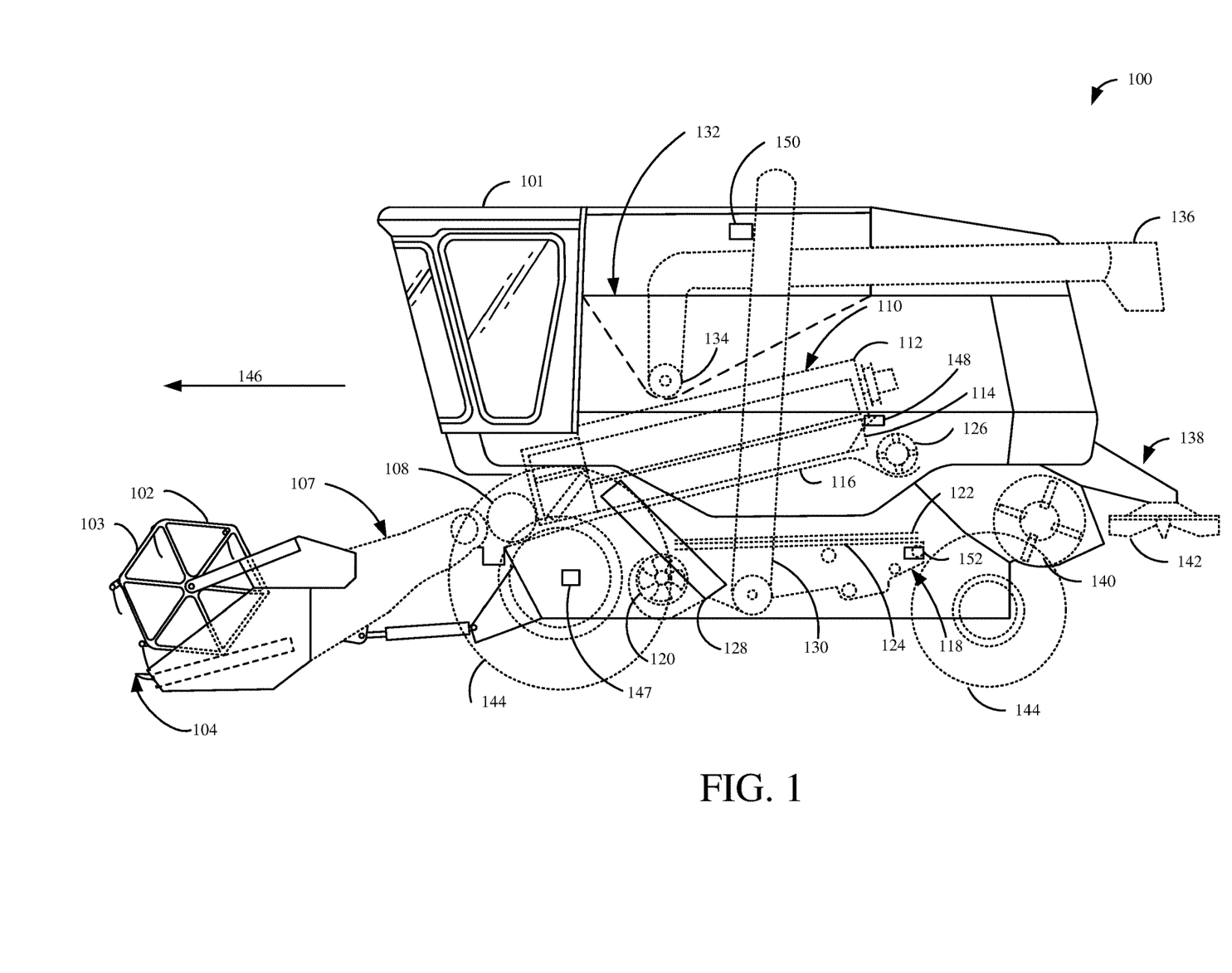
FIG. 1 illustrates a partial pictorial, partial schematic view of an example mobile harvesting machine.

FIG. 1 is a partial pictorial, partial schematic, illustration of an agricultural machine 100, in an example where machine 100 is a combine harvester (also referred to as combine 100 or machine 100). It can be seen in FIG. 1 that combine 100 illustratively includes an operator compartment 101, which can have a variety of different operator interface mechanisms, for controlling combine 100. Combine 100 can include a set of front end equipment that can include header 102, and a cutter generally indicated at 104. It can also include a feeder house 107, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 107 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, the crop can be engaged by reel 103 that moves the crop to feeding tracks 154, 156 (shown in FIG. 2). Feeding tracks 154, 156 move the crop to the center of the head 102 and then through a center feeding track 158 (all shown in FIG. 2) in feeder house 107 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

In one example, combine 100 has a tailings system where tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 147 illustratively senses the travel speed of combine 100 over the ground. This can be done by sensing the speed of rotation of the wheels, the drive shaft, the axle, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

Figure 2:
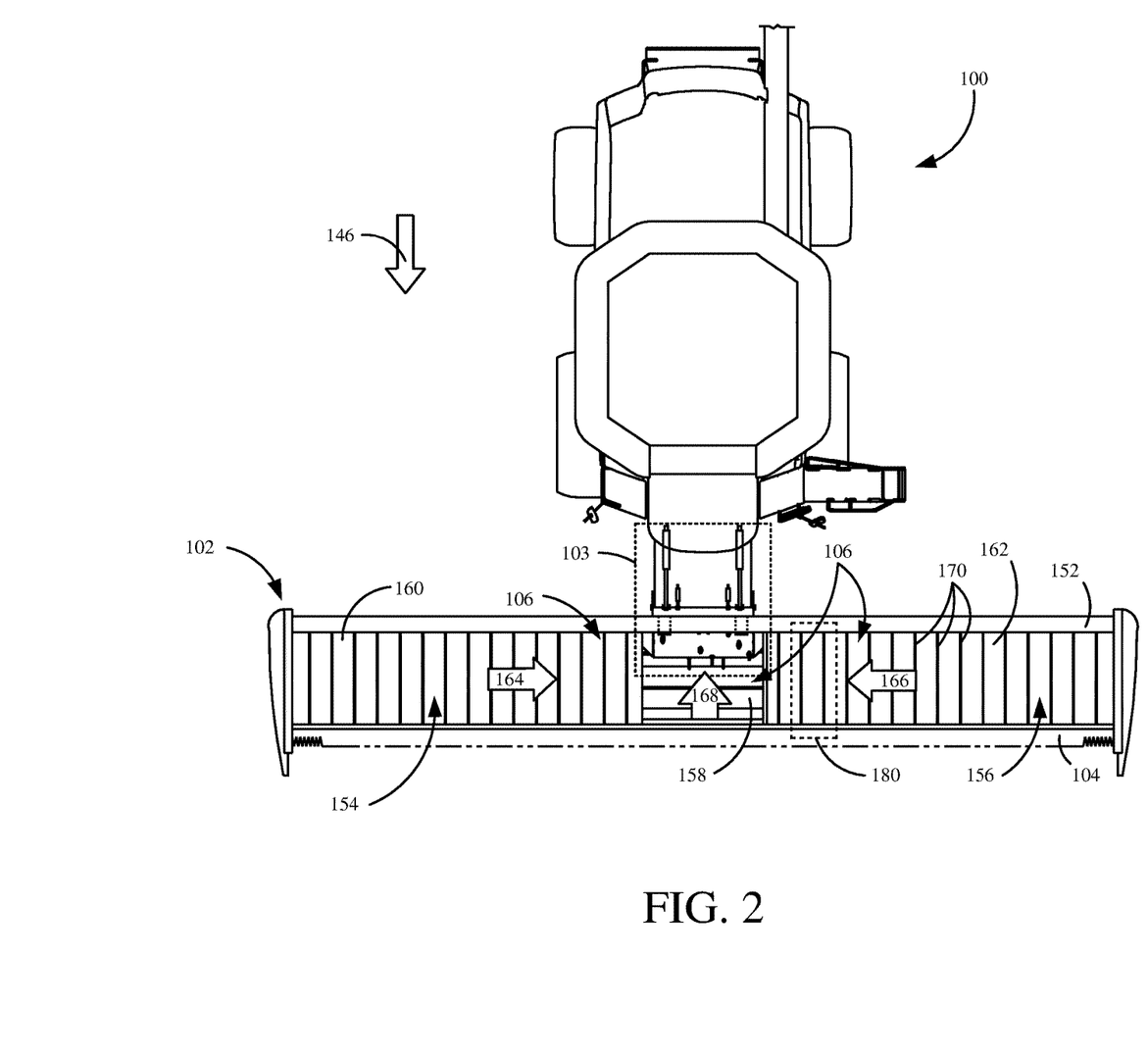
FIG. 2 illustrates a plan view of one example of a mobile harvesting machine.

FIG. 2 illustrates one example of a combine. Affixed on the front end of Combine 100 is a head 102. Head 102 includes frame 152 that extends laterally, perpendicular to the direction of travel 146 of combine 100. Frame 152 supports cutter 104, left side feeding track 154, right side feeding track 156, and center feeding track 158. Left side feeding track 154 comprises first endless track 160 that extends from an outer end of the left-side of the agricultural harvesting head to a point adjacent to the center of head 102. In a similar and mirror fashion, right-side feeding track 156 comprises second endless track 162 that extends from an outer end of the right side of head 102 to a point adjacent to the lateral midpoint of head 102.

Each of these two feeding tracks 154, 156 is supported on rollers (not shown) at the opposite ends of the track. Each of the two feeding tracks 154, 156 recirculate about its corresponding rollers. The direction of movement of the upper guiding surface of each feeding track is indicated by arrows 164, and 168.

Center feeding track 158 likewise has an endless track supported on rollers at opposite ends of the track and about which the track recirculates. The center endless track 158, however, moves in a direction parallel to the direction of travel 146 of combine 100. The upper surface of center feeding track 158 moves rearwardly to carry cut crop material received from left feeding track 154 and right feeding track 156 and to carry it rearwardly into feeder house 107 and thence into combine 100 itself.

Feeding tracks 154,156 can have a base layer comprising a thin web of elastomer-impregnated (e.g. rubber) fabric having constant thickness. This base layer is approximately 1-1.5 meters in width. The base layer of the side feeding tracks is approximately 8-15 meters in length. The ends of these base layers are spliced or cured together at their opposing ends to form a continuous loop. The feeding tracks can, of course, be made differently as well.

To the outer surface of this base layer, several elongate cleats 170 (also called ridges or ribs) are fixed. In one example, cleats 170 are straight, evenly spaced apart and extend perpendicular to the direction of travel of the tracks. These cleats 170 extend upwardly from the surface of the flat base web of the tracks. In one example, the spacing of adjacent cleats 170 is approximately 30 cm, however, the spacing could be greater or less than 30 cm. Cleats 170 function to engage the cut crop mat that falls upon the upper surface of the tracks, and to help move the left and right crop mats inwardly to the middle of the head 102 and then rearwardly into the feeder house 107.

Figure 3:
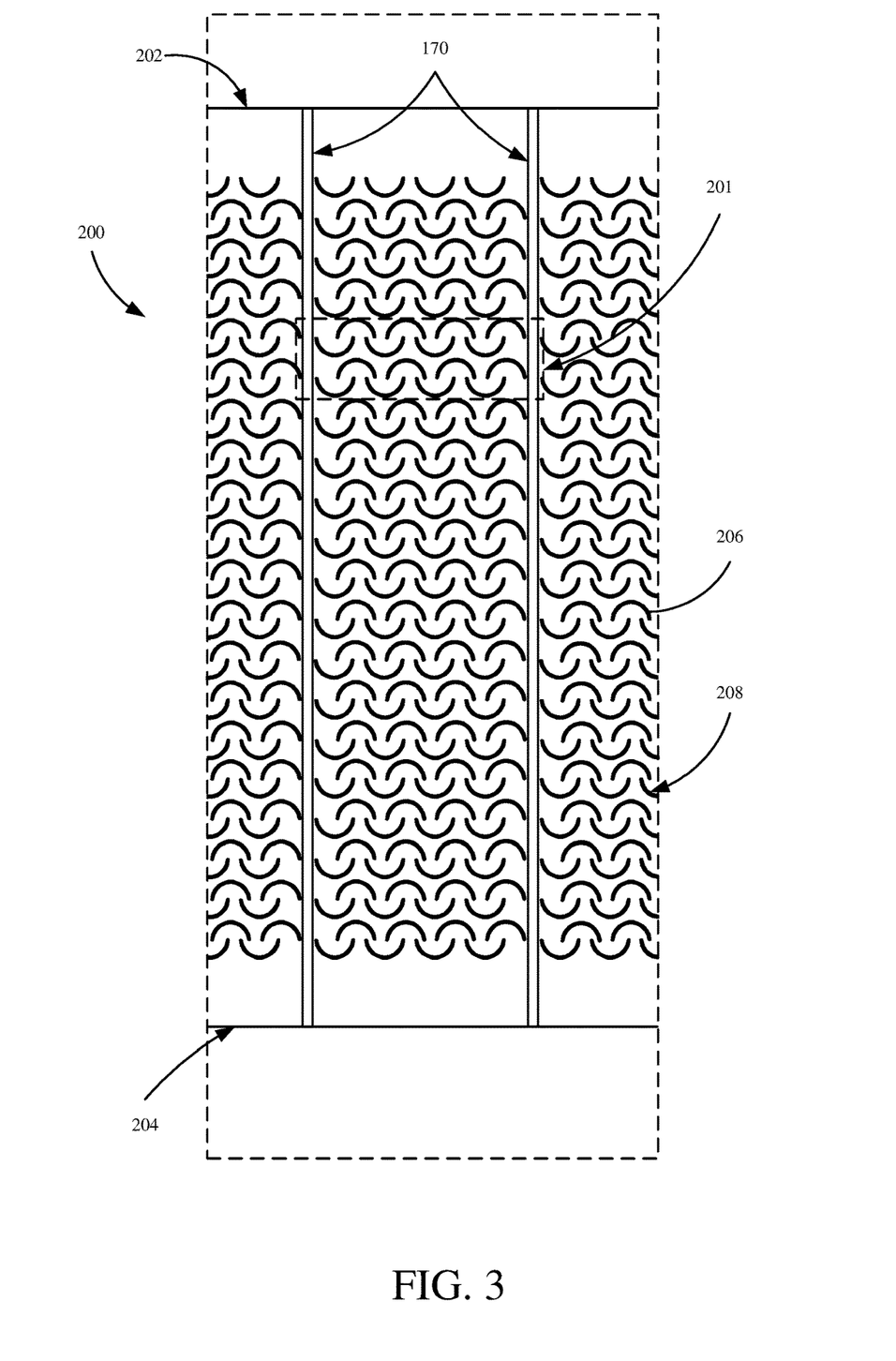
FIG. 3 illustrates an example plan view of a repeating pattern of a feeding track of the agricultural harvester of FIG. 1.
Figure 4:
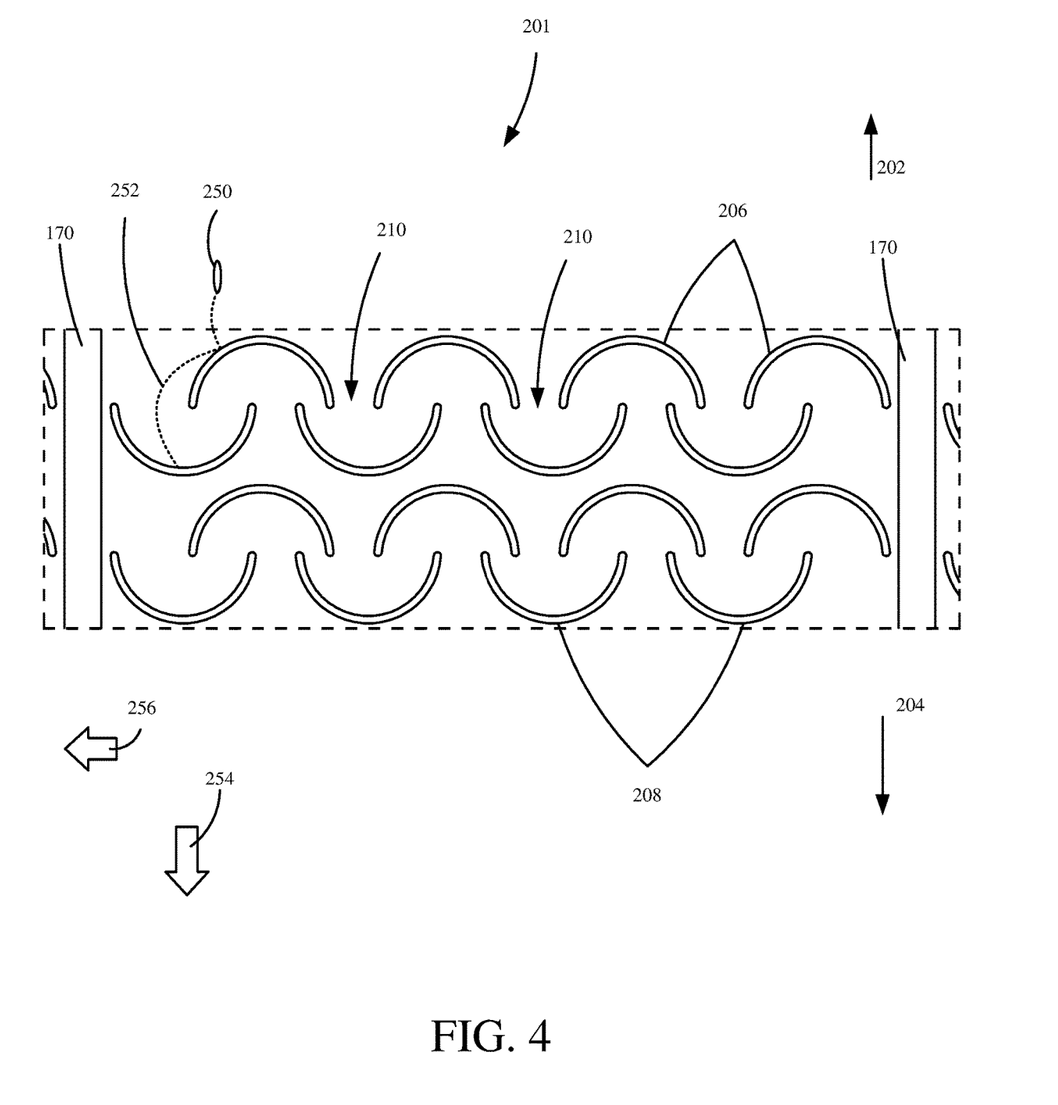
FIG. 4 illustrates an example fragmentary plan view of repeating details of the track pattern of the feeding track of FIG. 2.

FIGS. 3 and 4 illustrate a repeating section of the left side feeding track (the right side endless feeding track can be constructed identically). In FIG. 3, two adjacent cleats 170 bracket a repeating pattern of protrusions that extend from the upper surface of the endless tracks and that comprise adjacent semicircles 200. Semicircles 200 include a first group of semicircles 206 that open toward the rear edge 202 of the endless track, and a second group of semicircles 208 that open toward the front edge 204 of the endless track. The semicircles 200 can have a radius of 22 mm, but can have different radiuses as well.

Rear edge 202 of feeding track 200 is disposed above front edge 204 of the track, and thus grain falling out of the cut crop mat traveling on top of the track 200 will fall on to the web of the track between the cleats 170 and will tend to roll in the downward direction 254 (e.g. from edge 202 to edge 204).

In FIG. 4, as grain 250 falls onto feeding track 200 and rolls in the downward direction 254 under the force of gravity, it will contact the convex side of the semicircles 206, roll around and along the convex side to the ends of the semicircles 206, and fall into a gap 210 between adjacent semicircles 206. The grain falling into the gap 210 will be deposited into a concave side of semicircles 208, which will receive the grain and carry the grain, as in a curved bucket. Grain is carried this way to the end of the endless track, where it loops around a roller and drops the grain onto the center track 158.

Figure 5:
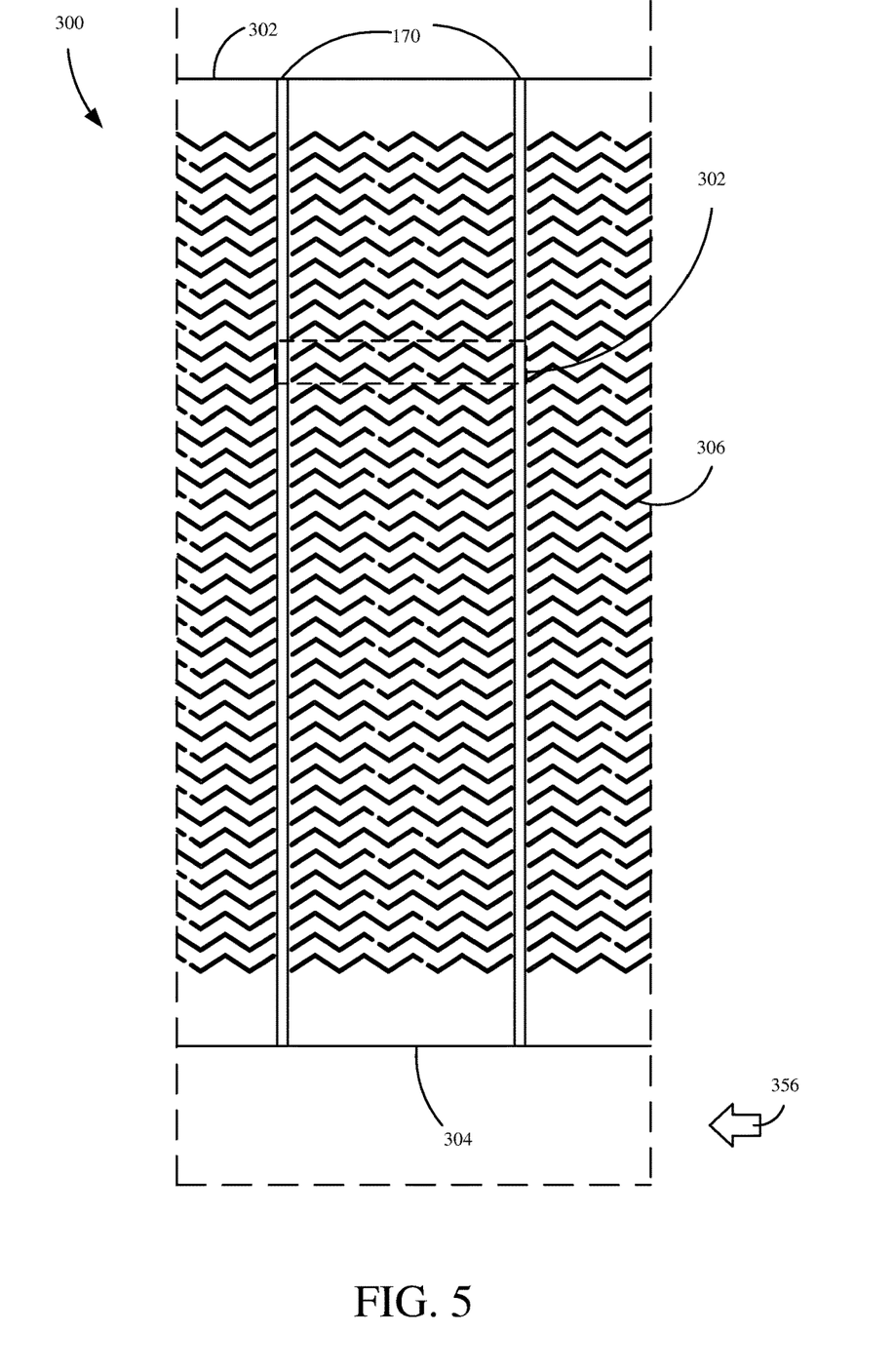
FIG. 5 illustrates an example plan view of an alternative repeating pattern of a feeding track of the agricultural harvester of FIG. 2.
Figure 6:
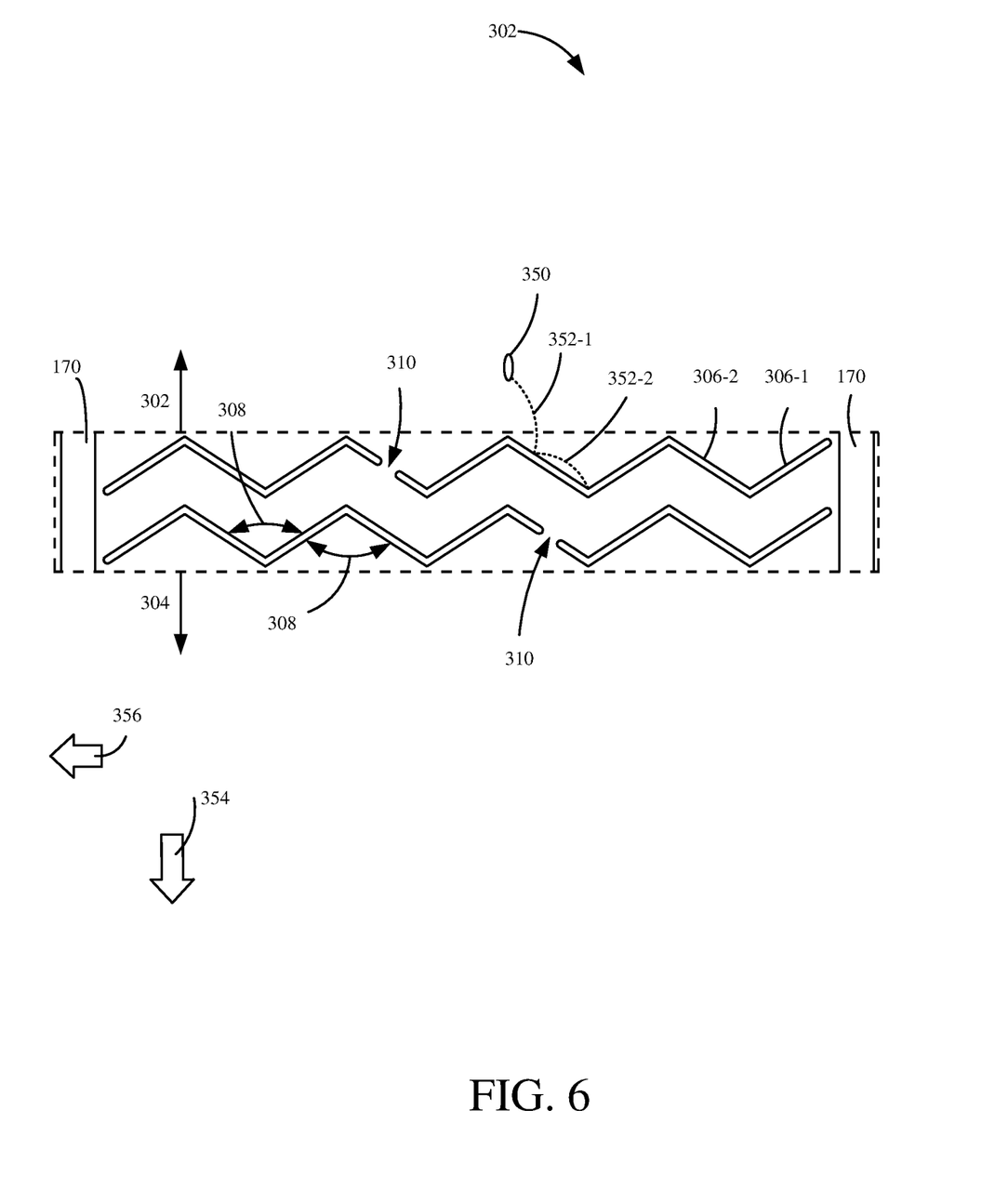
FIG. 6 illustrates an example fragmentary plan view of repeating details of the alternative repeating pattern of the track of FIG. 2.

FIGS. 5 and 6 illustrate an alternative repeating section of the left side conveyor track (the right-side conveyor track can be constructed identically). In FIG. 5, two adjacent cleats 170 bracket an alternative repeating pattern of elongate zigzag protrusions 306 that extend upward from the upper surface of the endless tracks. These protrusions 306 extend from one cleat 170 to an adjacent cleat 170. They cover substantially the entire upper (crop-carrying) surface of the endless track in a direction parallel to the direction 356 of travel of the track as it recirculates about the rollers that support it on opposing ends. As shown in FIG. 6, protrusions 306 are not straight, but are zigzag, comprising a plurality of incline lengths 306-1 and decline lengths 306-2 that abut each other at their ends to form angles 308. Than incline and decline lengths 306-1, 306-2 may be 40 mm long, but can be other lengths as well. In one example, angles 308 can measure between 90° and 150°. More particularly, angles 308 can measure between 100° and 130°. Further still, angles 308 can measure between 105° and 125°. In some examples, periodic breaks 310 may be present. In other examples, there are no periodic breaks 310.

Rear edge 302 of the feeding track 300 is disposed above the front edge 304 of the track, and thus grain falling out of the cut crop mat traveling on top of the track will fall on to the web of the track between the cleats 170 and will tend to roll in the downward direction 354 (e.g. from edge 302 to edge 304). An example grain 350 and its path 352 are illustrated in FIG. 6. The grain 350 acting under the force of gravity will travel in the downward direction 354. The grains path 352-1 in the downward direction 354 is impeded by a decline length 306-2. The inertia of grain 350 may shift the grain 350 in a direction opposite the direction of the track direction 356 as indicated by path portion 352-2. However, grain 350 does not fall off protrusion 306 because its motion is impeded by vertical portion 306-2.

Figure 7:
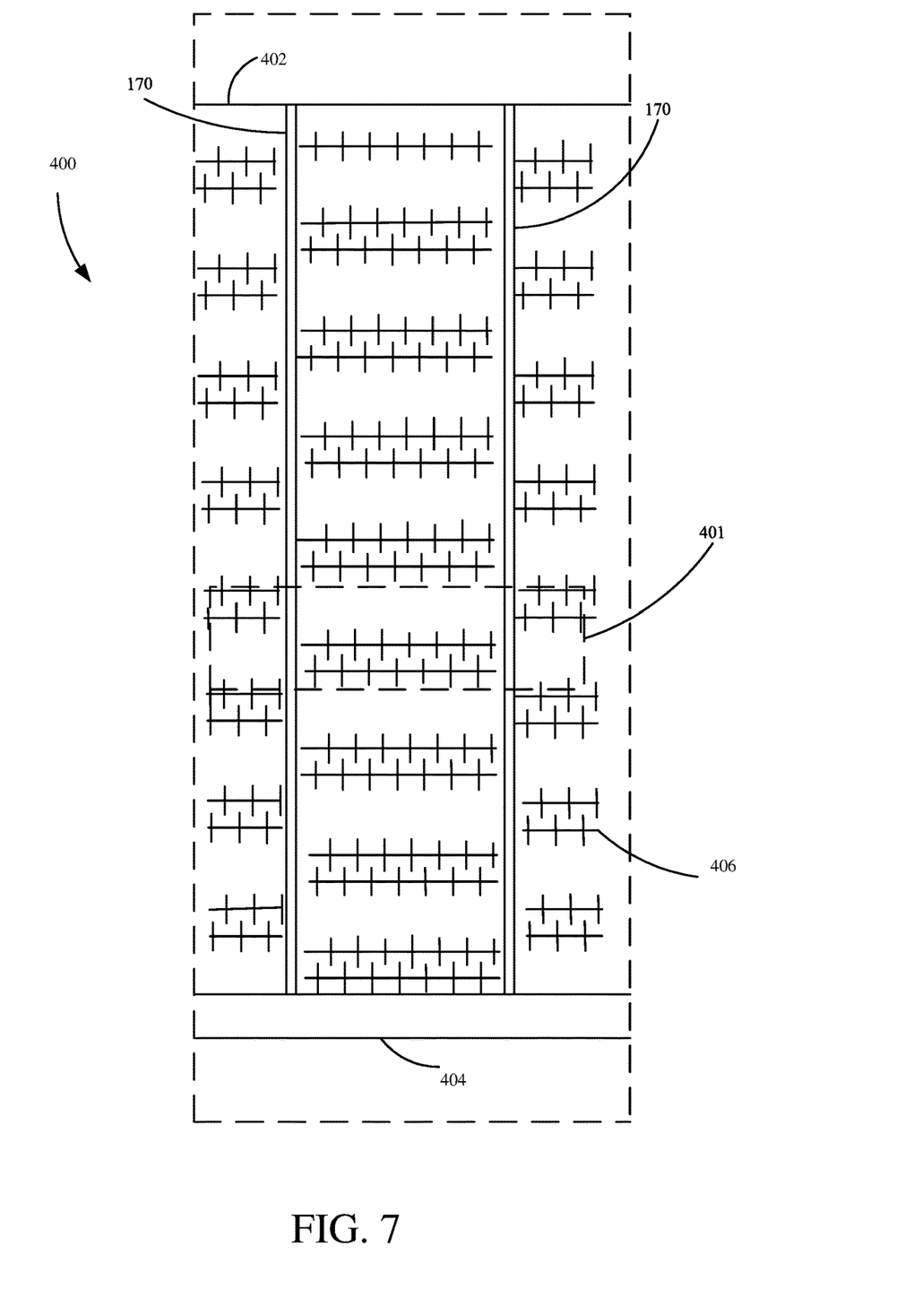
FIG. 7 illustrates an example plan view of an alternative repeating pattern of a feeding track of the agricultural harvester of FIG. 2.
Figure 8:
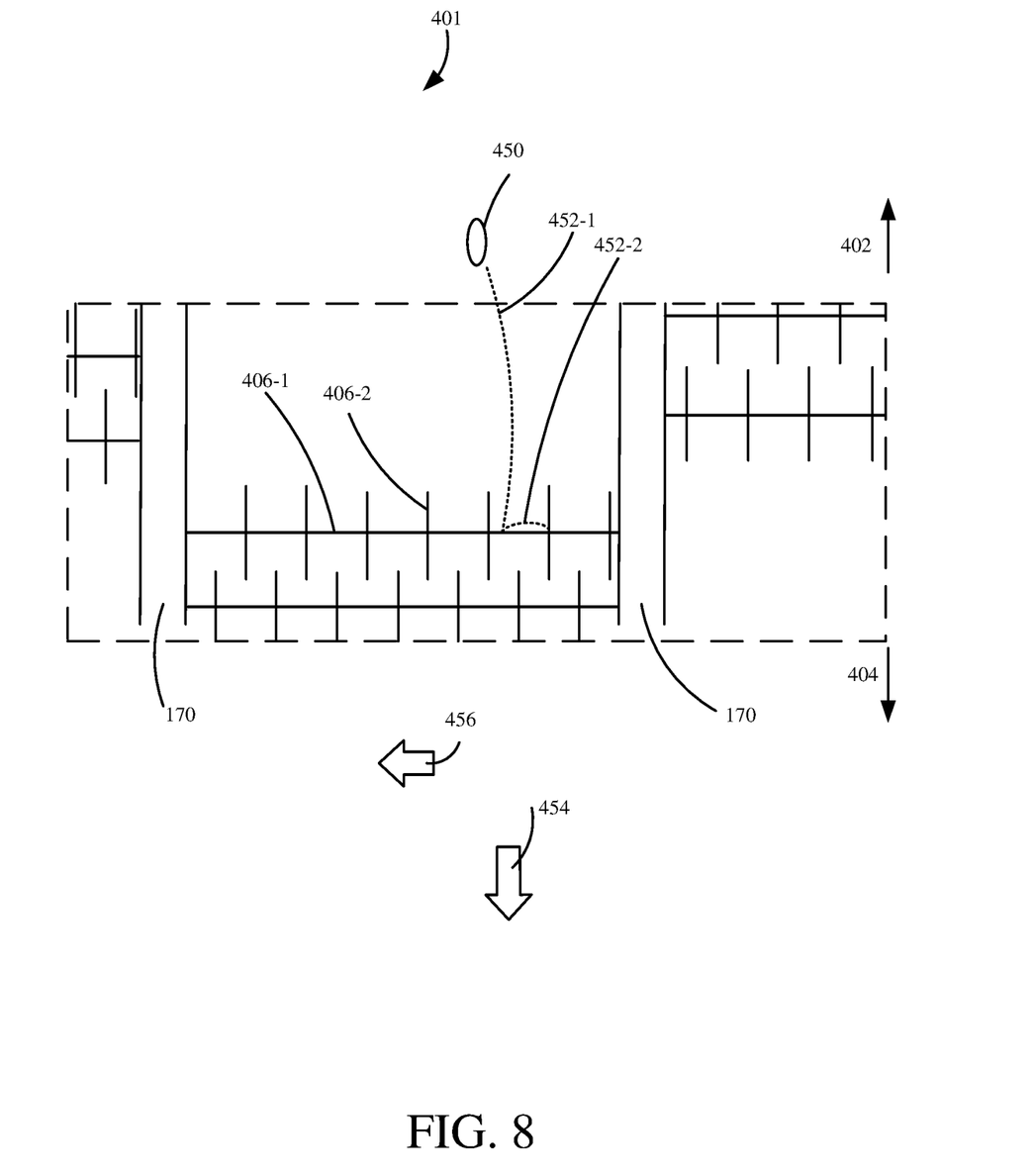
FIG. 8 illustrates an example fragmentary plan view of repeating details of the alternative repeating pattern of the track of FIG. 2.

FIGS. 7 and 8 illustrate an alternative repeating section of the left side conveyor track (the right-side conveyor track can be constructed identically). In FIG. 7 two adjacent cleats 170 bracket an alternative repeating pattern of elongated I-shaped protrusions 406 that extend upward from the upper surface of the endless tracks these protrusions 406 overlappingly repeat from one cleat 170 to an adjacent cleat 170. The overlapping features of these protrusions 406 covers substantially the entire surface of the endless track in a direction parallel to the direction 456 of travel of the track as it recirculates about the rollers that support it on opposing ends.

As shown in FIG. 8, protrusions 406 have two portions, horizontal portions 406-1 and vertical portions 406-2. Horizontal portions 406-1 run substantially parallel to a track movement direction 456. Vertical portions 406-2 run substantially perpendicular to a track movement direction 456. Horizontal portions 406-1 may extend entirely from one cleat 170 to another cleat 170. In other examples, horizontal portion 406-1 may comprise one or more breaks. Vertical portions 406-2 as shown are 14 mm in length, but can be other lengths as well.

The rear edge 402 of the feeding track 400 is disposed above the front edge 404 of the track, and thus grain falling out of the cut crop mat traveling on top of the track will fall on to the web of the track between the cleats 170 and will tend to roll in the downward direction 454 (e.g. from edge 402 to edge 404).

An example grain 450 and its path 452-1,452-2 is also shown. The grain 450 acting under the force of gravity will travel in the downward direction 454 as indicated by path portion 452-1. The grain's path in the downward direction 454 is impeded by a horizontal portion 406-1. The inertia of grain 450 may shift grain 450 in a direction opposite the direction of the track direction 456 as indicated by path portion 452-2. However, grain 450 does not fall off protrusion 406 as its motion is impeded by vertical portion 406-2.

Figure 9:
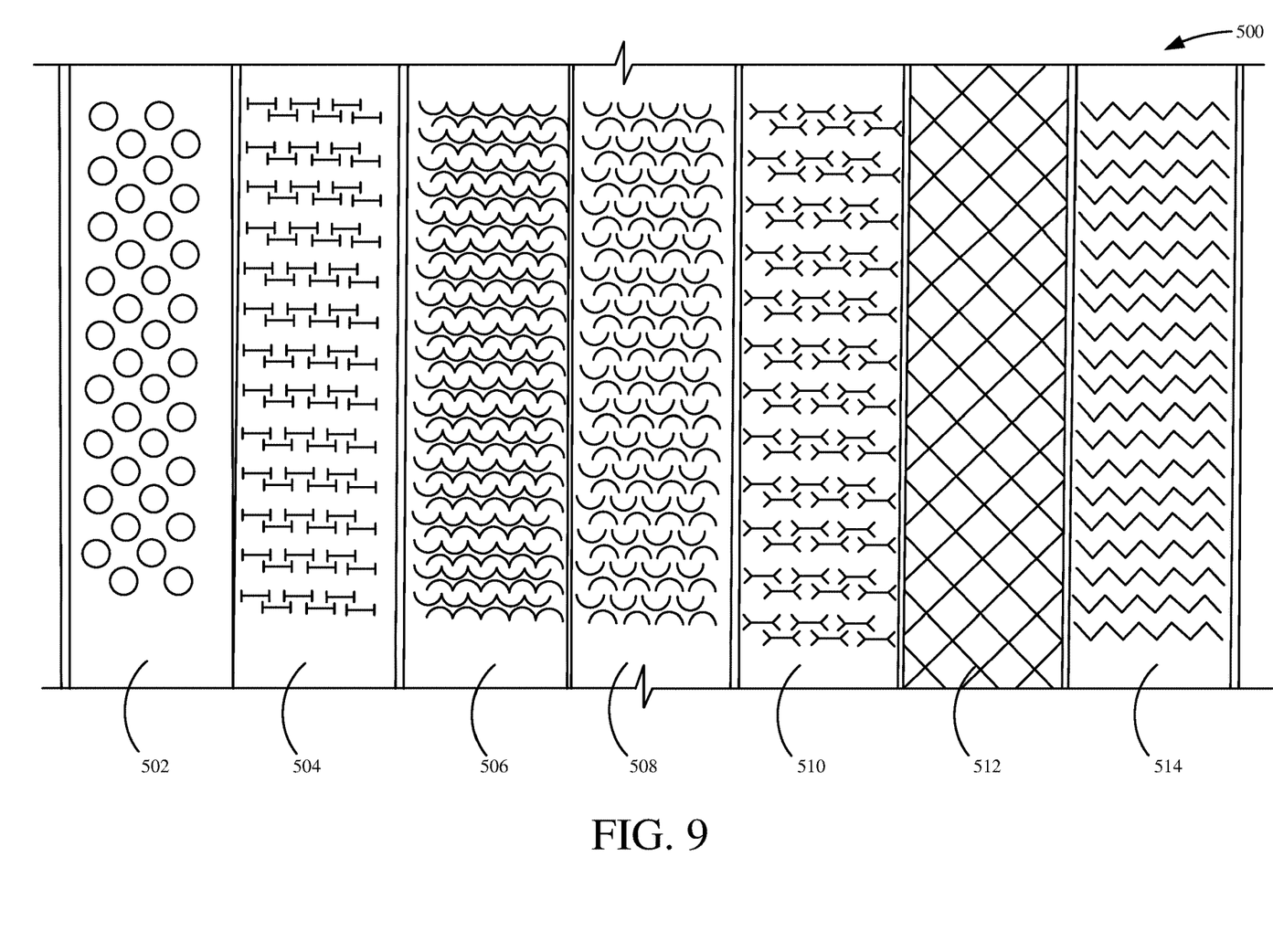
FIG. 9 illustrates several examples of alternate repeating patterns of a feeding track.

FIG. 9 illustrates a plurality of different patterns of protrusions usable on a feeding track in accordance with examples herein described. Section 502 comprises a pattern of circular protrusions. Section 504 comprises a pattern of I-shaped protrusions. Section 506 comprises a pattern of waves. Section 508 comprises a pattern of semi-circle protrusions similar to those of FIGS. 3 and 4. Section 510 comprises a pattern of tie-shaped protrusions. Section 512 comprises a pattern of diamond-shaped protrusions. Section 514 comprises a pattern of zig zag shaped protrusions similar to those of FIGS. 5 and 6.

The feeding tracks of FIGS. 3-9 may be formed out of a continuous web of material with molded-on protrusions and cleats extending from the surface or the protrusions and cleats may be fixed to the web of material. The protrusions may extend 2-5 mm off of the surface of the web. The cleats may extend 19 mm off of the surface of the web. Further, the ends of the feeding tracks may be held together by a mechanical splice to create the endless loop of the track, or the track may be formed without a mechanical splice such as by abutting or overlapping the ends of the web together and curing the ends together such as by a vulcanization process.

Agricultural feeding tracks are different from those in other applications. These feeding tracks are tilted at a downward angle such that objects are inclined to fall transversely across the track. Also, these feeding tracks are located on a mobile agricultural machine that has frequent motion in all different directions. This jarring further compounds the problems associated with the downward angle.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural harvester comprising:
   an operator compartment;
   an agricultural harvesting head comprising:
   a frame that supports a cutter configured to cut an agricultural product;
   a set of laterally extending and forward tilting feeding tracks configured to guide the cut agricultural product to a center of the agricultural harvesting head, the set of feeding tracks comprising:
   a base web of elastomer-impregnated fabric;
   a plurality of elongated cleats that extend upward from the base web and extend across substantially the entire width of the base web;
   a plurality of textured protrusions that extend upward from the web a distance sufficient to catch and hold grain rolling downhill in a direction perpendicular to the direction of travel of the feeding track, wherein the textured protrusions are between adjacent cleats and extend over substantially the entire length of the base web; and
   a center feeding track configured to receive the cut agricultural product from the set of laterally extending feeding tracks and guide the agricultural product into a body of the agricultural harvester.

2. The agricultural harvester of claim 1, wherein the textured protrusions comprise horizontal features, parallel to a direction of travel of the feeding track.

3. The agricultural harvester of claim 2, wherein the textured protrusions comprise vertical features, perpendicular to the direction of travel of the feeding track.

4. The agricultural harvester of claim 3, wherein the textured protrusions are aligned in rows and the vertical features of each row are horizontally offset from the vertical features of adjacent rows.

5. The agricultural harvester of claim 4, wherein the rows of textured protrusions on a first side of a cleat are vertically offset from rows of textured protrusions on a second side of the cleat.

6. The agricultural harvester of claim 1, wherein the textured protrusions comprise semi-circle shapes.

7. The agricultural harvester of claim 1, wherein the textured protrusions form a zigzag pattern and wherein that pattern extends in a direction of movement of the feeding track.

8. The agricultural harvester of claim 7, wherein each of the zigzag protrusions defines an obtuse angle of between 100 and 130° at each zigzag.

9. The agricultural harvester of claim 2, wherein each textured protrusion extends between two adjacent cleats and terminates at the two adjacent cleats.

10. An agricultural harvesting head comprising:
    a frame that supports a cutter configured to cut an agricultural product;
    a reel configured to direct the cut product to a set of laterally extending and forward tilted feeding tracks;
    the set of laterally extending and forward tilted feeding tracks configured to guide the cut agricultural product to a center of the agricultural harvesting head, the set of feeding tracks comprising:
    a base web of elastomer-impregnated fabric;
    elongate cleats that protrude upward from the base web and extend across substantially the entire width of the base web; and
    a plurality of protrusions that protrude upward from the web a distance sufficient to catch and hold grain rolling downhill in a direction perpendicular to the direction of travel of the feeding track,
    wherein the protrusions are located between adjacent cleats.

11. The feeding track of claim 10, wherein the protrusions comprise features perpendicular and parallel to a direction of travel of the feeding track.

12. The feeding track of claim, wherein the protrusions are aligned in rows are separated by a first distance and each row comprises two sub-rows of protrusions separated by a second distance, the first distance being greater than the second distance.

13. The feeding track of claim 10, wherein the cleats protrude upward a first distance and the protrusions protrude upward a second distance, wherein the first distance is greater than the second distance.

14. The feeding track of claim 13, wherein the second distance is greater than 2 mm and less than 5 mm.

15. The feeding track of claim 10, wherein the protrusions form a zigzag pattern parallel to a direction of movement of the feeding track.

16. The feeding track of claim 10, wherein the protrusions are aligned in rows perpendicular to the cleats and each row comprises two sub-rows, the first sub-row above the second sub-row, the first sub-row comprises a plurality of semi-circles with an open end downward facing, the second sub-row comprises a plurality of semicircles with an open end upward facing.

17. A feeding track configured for forward tilted mounting on an agricultural harvesting head comprising:
    a base web of rubber-impregnated fabric;
    elongated cleats that extend upward from the base web and extend across substantially the entire width of the base web; and
    a plurality of textured protrusions that extend upward a distance from the web sufficient to catch and hold grain rolling downhill in a direction perpendicular to the direction of travel of the feeding track, wherein the textured protrusions are between adjacent cleats and extend over substantially the entire length of the base web.

18. The feeding track of claim 17, wherein the textured protrusions are aligned in rows, the rows are separated by a first distance and each row comprises two sub-rows separated by a second distance, the first distance being greater than the second distance.

19. The feeding track of claim 18, wherein the rows of protrusions comprise features perpendicular and parallel to a direction of travel of the feeding track.

* * * * *